(12) United States Patent
Hennig et al.

(10) Patent No.: US 6,768,622 B2
(45) Date of Patent: Jul. 27, 2004

(54) METHOD AND APPARATUS FOR PROVIDING THERMAL SHUTDOWN AND CURRENT LIMITING PROTECTION

(75) Inventors: Bruce Hennig, Pleasanton, CA (US); Lawrence S. Mazer, San Jose, CA (US)

(73) Assignee: Micrel, Incorporated, San Jose, CA (US)

( * ) Notice: Subject to any disclaimer, the term of this patent is extended or adjusted under 35 U.S.C. 154(b) by 671 days.

(21) Appl. No.: 09/727,814

(22) Filed: Nov. 30, 2000

(65) Prior Publication Data

US 2002/0064008 A1 May 30, 2002

(51) Int. Cl.[7] .............................................. H02H 3/00
(52) U.S. Cl. ...................................................... 361/93.4
(58) Field of Search ............................... 361/93.1, 93.2, 361/93.4, 93.7, 93.8, 93.9, 92, 100, 101, 103

(56) References Cited

U.S. PATENT DOCUMENTS 4,634,936 A * 1/1987 Gentry et al. ................ 315/307
6,424,512 B1 * 7/2002 Schmacht ................... 361/93.1

OTHER PUBLICATIONS

Author Unknown, *USB Current–Limited Switches with Fault Blanking*, Maxim Integrated Products, Product Brochure, File No. 19–1518, Rev 0; 09/99, pp. 1, 6 & 7.

* cited by examiner

*Primary Examiner*—Ronald Leja
(74) *Attorney, Agent, or Firm*—Edward N. Bachand; Dorsey & Whitney LLP

(57) ABSTRACT

The present invention provides an apparatus and method for preventing damage to a system due to runaway current and provides for the reactivation of the system. The shutdown and reactivation method and apparatus includes a driving circuit which supplies an output current to a load. If a runaway current condition occurs in the system the shutdown and reactivation apparatus is activated by triggering a shutdown signal which deactivates the driving circuit such that the output current is no longer supplied to the load. The shutdown signal activates a charging circuit, which supplies a charging current to the load. A first monitoring circuit is coupled with the load, and configured to monitor an output voltage across the load when the shutdown and reactivation apparatus is in the active state. The first monitoring circuit signals the shutdown and reactivation apparatus to transition to a deactivated state when the output voltage is at least equal to a predefined voltage threshold, and further the first monitoring circuit signals the driving circuit to again begin to supply the output current to the load.

29 Claims, 7 Drawing Sheets

METHOD AND APPARATUS FOR PROVIDING THERMAL SHUTDOWN AND CURRENT LIMITING PROTECTION

INTRODUCTION

1. Technical Field

This invention pertains to a runaway current and thermal protection method and apparatus, and more particularly to a method and apparatus for reactivating a system once the cause of the runaway current and excessive heat is eliminated.

2. Background

It has long been known in the prior art to provide thermal shutdown for electronic systems and microchips to prevent the system or chip from generating an excess amount of heat which can damage the system or chip. The generation of excess heat, in one example, is caused when the output load driven by the system is short circuited to ground or low voltage potential which causes the output voltage across the load to drop to substantially zero or the low potential voltage and allow an excess of current to flow through short circuit. This excess current induces a high power dissipation in the system and causes the system to heat up. Protection mechanisms have been developed to prevent the system from continuing to supply the excessive current to the short circuit once the system has reached a predefined temperature. One technique for reactivating a system after thermal shutdown requires the entire system to be powered down and powered up again or re-enabled once the short circuit has been removed. This is time consuming and generally requires user interaction. An alternative technique powers down the system and begins to monitor the temperature of the system. Once the system has cooled below a predefined temperature, the system reactivates. However, if the short is still present, the system will quickly heat up again only to be shut off by the thermal shutdown mechanism of the system. The system will continue to transition on and off, utilizing large amounts of power and potentially damaging the system, until the short circuit is removed.

SUMMARY

The present invention provides an apparatus and method for preventing damage to a system due to excessive heat or current and reactivating the system once the cause of the excess current and resulting heat is removed without requiring excessive amounts of power consumption or powering down the system. The apparatus and method is activated when a runaway current condition exists. In one embodiment the shutdown and reactivation apparatus includes a driving circuit which supplies an output current to a load. If the load is short circuited, the output current is greatly increased resulting in a runaway current condition causing the temperature of the system to increase due to high power dissipation. As a result of the increased temperature, the shutdown and reactivation apparatus is activated by triggering a shutdown signal which deactivates the driving circuit such that the output current is no longer supplied to the load. The shutdown signal activates a charging circuit, which supplies a charging current to the load. A first monitoring circuit is coupled with the load, and configured to monitor an output voltage across the load when the shutdown and reactivation apparatus is in the active state. When the short is removed, the charging current is applied to the load to charge a capacitive load. The first monitoring circuit signals the shutdown and reactivation apparatus to transition to a deactivated state when the output voltage across the capacitive load is at least equal to a predefined voltage threshold. The system is re-activated, the charging circuit is deactivated, and the driving circuit again begins to supply the load with the output current when the shutdown and reactivation apparatus is in the deactivated state.

In accordance with the teachings of this invention a novel method and structure is taught which provides the thermal protection of a system while further re-activating the system once the cause of the damaging effects is removed without requiring large power drains, without user interaction, and without requiring the system to be re-enabled or powered down.

DETAILED DESCRIPTION

Figure 1:
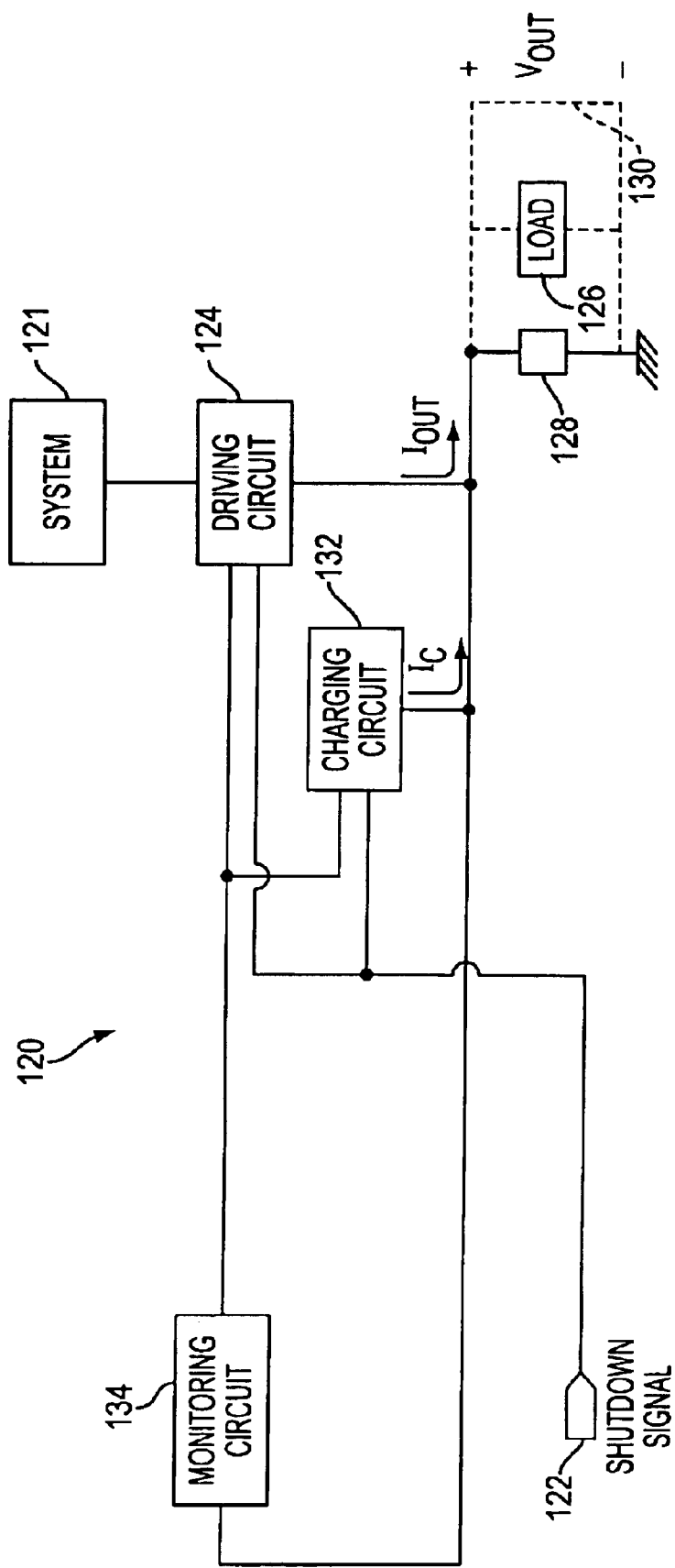
FIG. 1 depicts a block diagram of one implementation of one embodiment of the novel thermal and current shutdown protection circuit of the present invention.

The present invention provides for a thermal shutdown and current limiting protection mechanism, apparatus and method for preventing damage to a system due to excessively large current or high power dissipation causing a system or microchip to overheat. The present invention provides for the reactivation of the system once the cause of the excessively large current or high power dissipation has been eliminated. The present invention provides for this reactivation of a system or circuit without powering down the system, without utilizing excessive amounts of power and without further heating of the system. FIG. 1 depicts a block diagram of one implementation of one embodiment of the novel current and thermal shutdown protection and reactivation circuit 120 of the present invention. During normal operation of a system or microchip 121 implementing shutdown and reactivation circuit 120, a driving circuit 124 drives an output load 126. However, if load 126 should happen to be short circuited 130, the output voltage $V_{out}$ will drop and the output current $I_{out}$ supplied by system 121 will drastically increase resulting in a runaway current condition. This increased or runaway output current $I_{out}$ along with the voltage drop across the driving circuit 124 induces high power dissipation. In one embodiment, shutdown and reactivation circuit 120 is activated causing system 120 and output current $I_{out}$ to shutdown if the output current $I_{out}$ exceeds a threshold current level for a predefined period of time. In one embodiment, the higher power dissipation resulting from the increased output current $I_{out}$ causes system 121 to heat up to a predefined threshold temperature causing system 121 to enter current and/or thermal shutdown to prevent damage to system 121. When system 121 enters shutdown, system 121 activates shutdown signal 122 which deactivates driving circuit 124 discontinuing the supply of output current $I_{out}$ to load 126, and activates charging circuit 132. Charging circuit 132 couples a storage element 128 which is configured to generate a voltage potential. In one embodiment the storage element 128 is a capacitive load $C_L$. In one embodiment, capacitive load $C_L$ is added in parallel with a load 126. In an alternative embodiment, capacitive load $C_L$ is a capacitance existing within the load being driven by system 121.

Still referring to FIG. 1, in one embodiment, charging circuit 132 supplies a small charging current $I_C$, relative to output current $I_{out}$ conducted through short circuit 130, to load 126. Charging current $I_C$ supplied by charging circuit 132 is maintained at a sufficiently low level so as to allow the temperature of system 121 to decrease while load 126 is still short circuited. The size of charging current $I_C$ is determined by design parameters including size of capacitive load $C_L$ and desired recovery time of system 121. Because charging current $I_C$ is maintained at a relatively small level, shutdown and reactivation circuit 120 requires only a small amount of power to supply the small charging current $I_C$. Further, because charging current $I_C$ is maintained at a low level, charging current $I_C$ has only minor effects on the rate of temperature dissipation for system 121, allowing the temperature of system 121 to be brought back down to acceptable levels for normal operation. Due to the short circuit, the charging current $I_C$ passes through the short. Once short circuit 130 is eliminated and the runaway current condition has been eliminated, charging current $I_C$ is supplied to capacitive load $C_L$ charging capacitive load $C_L$. Monitoring circuit 134 monitors the voltage across the capacitive load $C_L$. Once the output voltage $V_{out}$ across capacitive load $C_L$ exceeds a predefined voltage threshold, monitoring circuit 134 is triggered. Once triggered, monitoring circuit 134 deactivates charging circuit 132, halting charging current $I_C$, and activating driving circuit 124 to again supply load 126 with output current $I_{out}$ as dictated by system 121 under normal operating conditions.

Thus, system 121 is reactivated to operate under normal conditions without large power drains, toggling the system off and on causing further over heating of the system and without re-enabling or powering down the system. In one embodiment, driving circuit 124 cannot be reactivated to supply output current $I_{out}$ to load 126 until the temperature of system 121 has been decreased below at least a lower operating temperature threshold. In one embodiment, driving circuit 124 cannot be reactivated until both shutdown signal is transition to a state designating the temperature of system 121 is within operating limits and monitoring circuit 134 detects the elimination of short 130 and the runaway current condition, and signals driving circuit 124.

Charging circuit 132 in combination with capacitive load $C_L$ prevents the need for deactivating or powering down system 121. When signaled to shutdown system 121 is put in a standby mode until signaled by shutdown and reactivation circuit 120 that load 126 is no longer shorted and system 121 can continue to operate as normal.

The desired response time of shutdown and reactivation circuit 120 is dependent on the size of charging current $I_C$ and the size of capacitive load $C_L$. The shorter the response time desired, the greater the charging current $I_C$ which must be supplied to capacitive load $C_L$ to rapidly charge capacitive load $C_L$ to the voltage threshold. In one embodiment, system 121 cannot be activated until the system 121 temperature has fallen below at least the temperature threshold or below a lower reactivation temperature. Further, the size of capacitive load $C_L$ also affects the response rate at which shutdown and reactivation circuit 120 is deactivated and system 121 is reactivated. The larger the capacitive load $C_L$, the slower the response time to reactivate system 121. Therefore, the response time is dictated by design parameters, including at least the size of charging current $I_C$, the size of capacitive load $C_L$ and the temperature dissipation rate of system 121.

In one embodiment, shutdown and reactivation circuit 120 includes a memory device (see FIG. 2), for example a latch or register, to allows a user to program or define the amount of charging current $I_C$ to be supplied to capacitive load $C_L$. This allows user to program shutdown and reactivation circuit 120 to provide a predefined response time based on the capacitive load $C_L$ utilized by user in implementing the present invention. In one embodiment, the memory device, such as a register, includes a plurality of pins such that user activates a first pin to obtain a first predefined charging current $I_C$ at a first current level and a second pin to obtain a second predefined charging current $I_C$ at a second current level.

One example of a system 121 which is optimized by implementing the present shutdown and reactivation circuit 120 is a Universal Serial Bus (USB) power distribution applications/systems for use in a portable personal computer (PC) or USB hubs.

The shutdown and reactivation apparatus and method of the present invention is capable of being implemented in any system and microchip which includes temperature and/or current shutdown capabilities including PCMCIA Power Controllers, Linear or Switching Regulators, Power Management, Motor Controllers, and any other system and chip implementing temperature and current shutdown.

In one embodiment, shutdown and reactivation circuit 120 is external to and electrically coupled with system 121 to operate in cooperation with system 121, thus allowing shutdown and reactivation circuit 120 to be incorporated with preexisting systems as well as any new system. In an alternative embodiment, shutdown and reactivation circuit 120 is incorporated into system 121 to provide thermal and current protection and reactivation.

Figure 2:
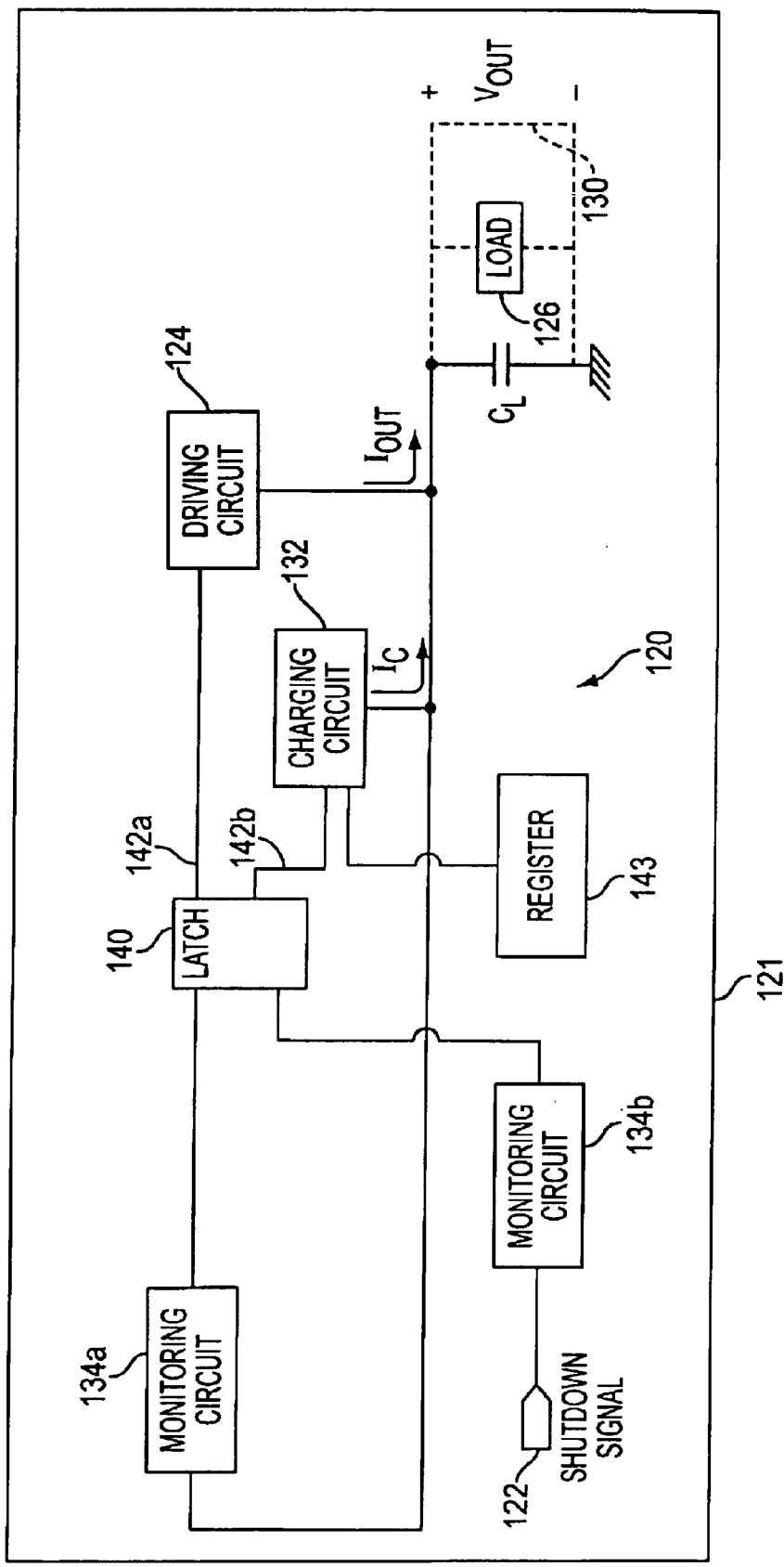
FIG. 2 shows a block diagram of an alternative implementation of one embodiment of thermal and current shutdown circuit incorporated within the system.

FIG. 2 shows a block diagram of one implementation of one embodiment of shutdown and reactivation circuit 120 incorporated within system 121. In the embodiment depicted in FIG. 2, shutdown and reactivation circuit 120 includes a latch 140 for maintaining the driving circuit 124 and charging circuit 132 in an active or deactivate state depending on whether shutdown and reactivation circuit 120 is active or deactivate as described above and more fully below. In one embodiment, latch 140 also allows user to define the desired charging current $I_C$ supplied to capacitive load $C_L$ as described above. Shutdown and reactivation circuit 120 depicted in FIG. 2 further includes a first and second monitoring circuit, 134a and 134b, for monitoring output voltage $V_{out}$ and shutdown signal 122, respectively. Thus, when shutdown signal 122 is activated, second monitoring circuit 134b recognizes the transition and signals latch 140 which receives shutdown signal 122 and registers or latches output levels 142a and 142b to both the driving circuit 124 and the charging circuit 132, respectively. Output levels 142a–b are maintained by latch 140, thus maintaining driving circuit 124 in an inactive state and charging circuit 132 in an active state, until output voltage $V_{out}$ across capacitive load $C_L$ reaches the predefined voltage threshold to activate first monitoring circuit 134a. First monitor circuit 134 then signals latch 140 which latches output levels 142a–b to reactivate driving circuit 124 and to deactivate charging circuit 132. In one embodiment, shutdown and reactivation circuit 120 includes register 143 coupled with charging circuit 132. Register 143 allows user to program shutdown and reactivation circuit 120 to provide a predefined charging current $I_C$ to capacitive load $C_L$. Register 143 signals charging circuit 132 to supply charging current $I_C$ at one of a plurality of current levels. In one embodiment, register 143 is included within charging circuit to allow a user to program charging circuit 132.

Figure 3:
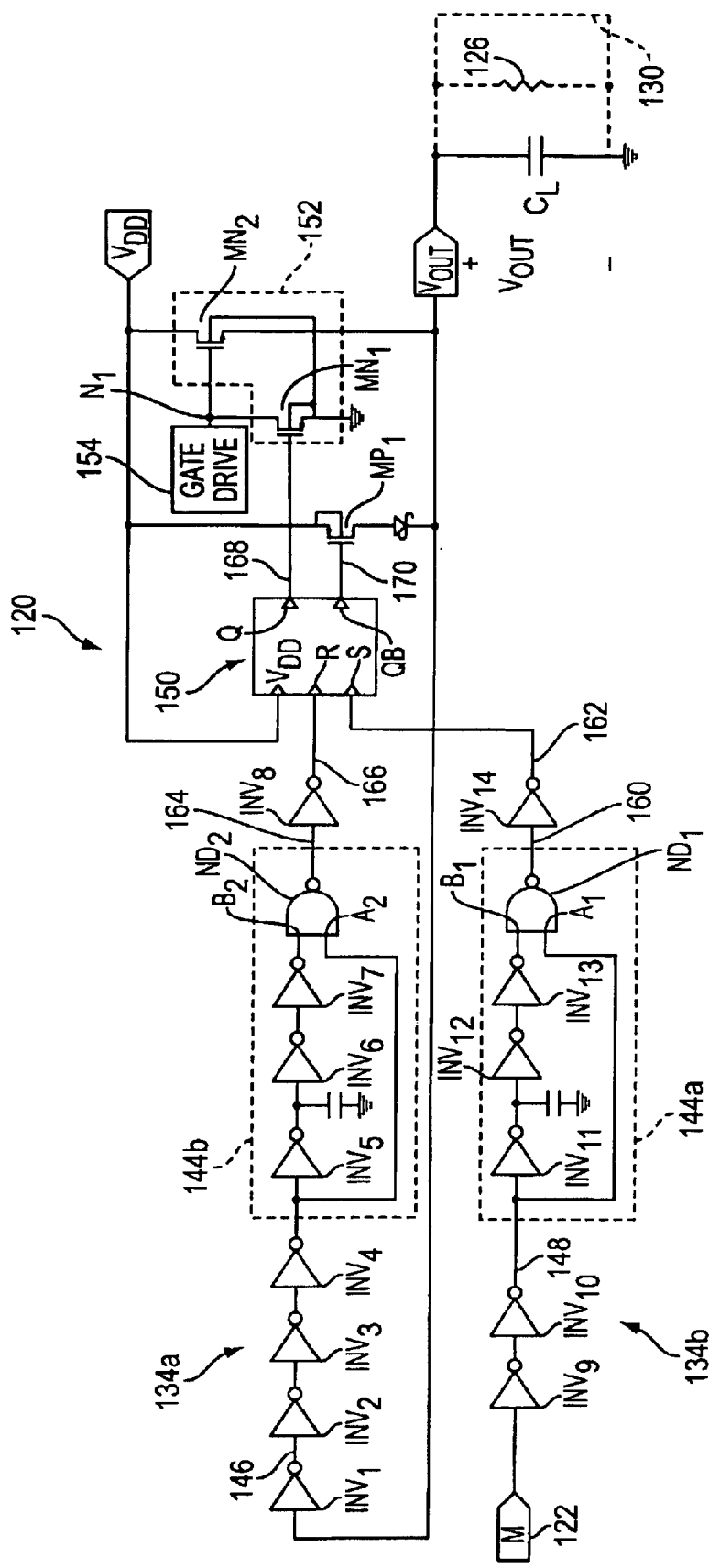
FIG. 3 depicts a schematic diagram of one embodiment of an alternative implementation of shutdown and reactivation circuit of the present invention.

FIG. 3 depicts a schematic diagram of one embodiment of an alternative implementation of shutdown and reactivation circuit 120. Shutdown signal 122 is directed through second monitoring circuit 134b including a series of inverters $INV_9$ and $INV_{10}$ coupled with a first edge detector 144a which detects a change in shutdown signal 122. In one embodiment, first edge detector 144a includes a first NAND gate $ND_1$ which has a first and second input, $A_1$ and $B_1$, respectively. First input $A_1$ receives an output signal from inverter $INV_{10}$ and second input $B_1$ receives an output from three inverters $INV_{11}$, $INV_{12}$ and $INV_{13}$ coupled in series. First edge detector 144a forwards the change in shutdown signal 122 through inverter $INV_{14}$ to a set-input S of flip-flop 150.

Still referring to FIG. 3, in one embodiment, first monitoring circuit 134a further includes a string of inverters $INV_1$, $INV_2$, $INV_3$ and $INV_4$ coupled in series supplying a threshold signal 146 to a second edge detector 144b. In one embodiment, second edge detector 144b includes a second NAND gate $ND_2$ which receives an output from inverter $INV_4$ as a first input $A_2$ and an output from three inverters $INV_5$, $IV_6$ and $INV_7$ coupled in series as a second input $B_2$. Second edge detector 144b forwards a signal through inverter $INV_8$ which in turn supplies a signal to a reset-input R of flip-flop 150.

In one embodiment, flip-flop 150 further includes a first and second output Q and QB, where second output QB is the inverse of first output Q. First flip-flop output Q activates and deactivates driving circuit 124, and second flip-flop output QB activates and deactivates charging circuit 132. In one embodiment, driving circuit 124 includes a switch 152 which switches driving circuit 124 between the active state to supply output current $I_{out}$ to load 126, and a deactivated state preventing output current $I_{out}$ from being supplied to load 126. In one embodiment, switch 152 consists of a first Nch transistor MN1 and a second Nch transistor MN2, where first Nch transistor MN1 receives first flip-flop output Q. When shutdown signal 122 has not been activated and system is operating under normal conditions, first flip-flop output Q is in a low state, deactivating first Nch transistor MN1, which allows second Nch transistor MN2 to operate in an active state supplying output current $I_{out}$ to load 126. Second Nch transistor MN2 is further coupled with a gate drive 154. Gate drive 154 controls the level of output current $I_{out}$ supplied through second Nch transistor MN2 to load 126, as dictated by system 121. Second flip-flop output QB couples with charging circuit 132 to activate and deactivate charging circuit 132. In one embodiment, charging circuit 132 includes a first Pch transistor MP1. When system 121 is operating under normal operating conditions, second flip-flop output QB is in a high state, thus, MP1 is off and charging circuit 132 is in a deactivated state. First Pch transistor MP1 is activated when shutdown signal 122 is triggered, which is latched through flip-flop 150 causing Q to transition high and QB to transition low. When Q transitions high, first Nch transistor MN1 of driving circuit 124 is activated pulling node N1 low effectively deactivating second Nch transistor MN2 and thus deactivating driving circuit 124. Once in a deactivated state, driving circuit 124 prevents output current $I_{out}$ from being supplied to load 126. When QB transitions low, charging circuit 132 is activated, activating first Pch transistor MP1 to supply charging current $I_C$ to capacitive load $C_L$.

Figure 4:
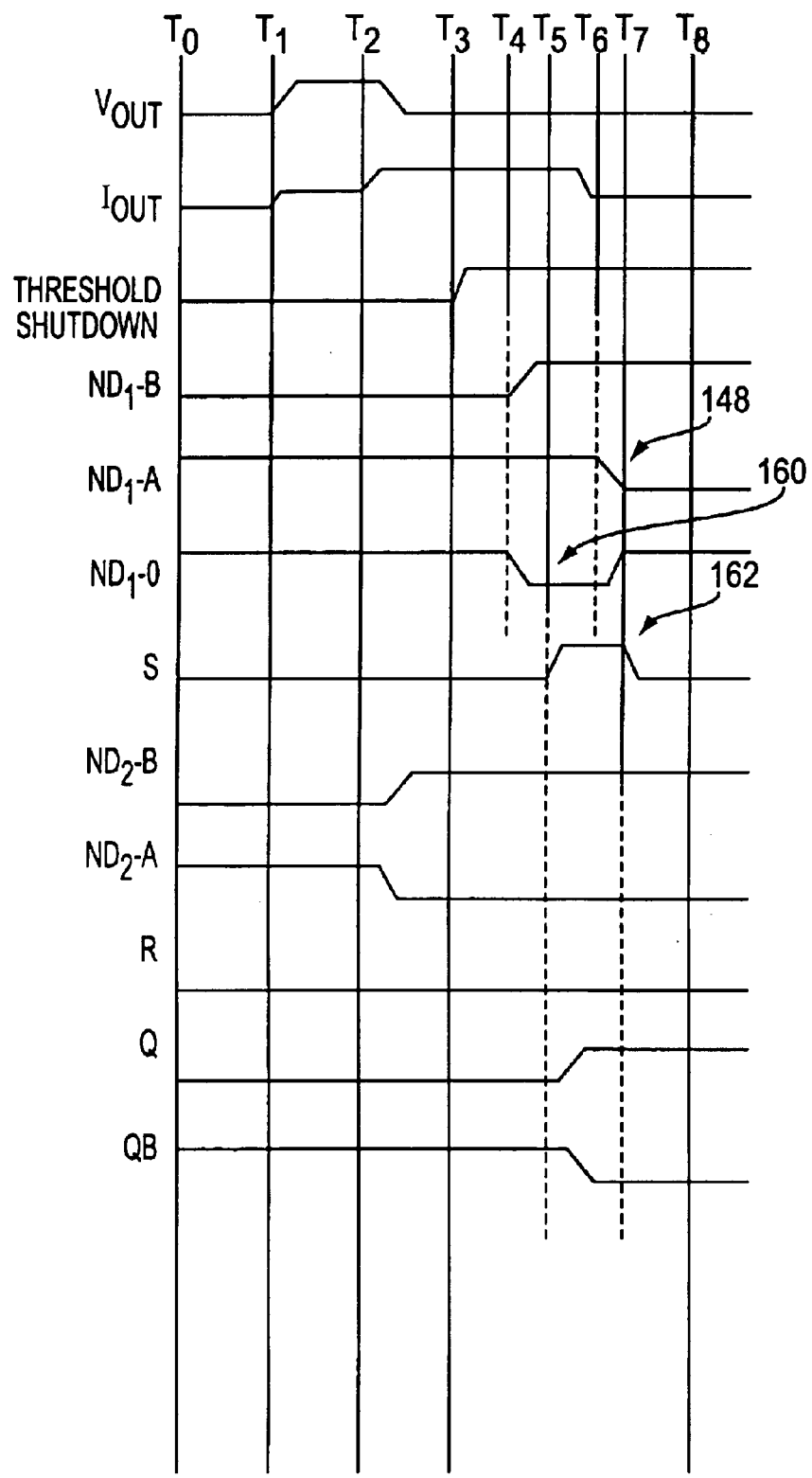
FIG. 4 shows one embodiment of a simplified timing diagram of the operation of the shutdown and reactivation circuit depicted in FIG. 3 when the shutdown signal is activated.

Referring to FIGS. 3 and 4, FIG. 4 shows one embodiment of a simplified timing diagram of the operation of the shutdown and reactivation circuit 120 depicted in FIG. 3 when shutdown signal 122 is activated resulting in the deactivation of driving circuit 124 and activation of charging circuit 132. At time $T_0$, system 121 and shutdown and reactivation circuit 120 are inactive. At time $T_1$, system 121 is activated, driving circuit 124 begins to supply output current $I_{out}$ to load 126 and output voltage $V_{out}$ ramps up across load 126. At time $T_2$, load 126 is short circuited causing the output voltage $V_{out}$ to drop, the output current $I_{out}$ to jump up to a high level, and the power dissipation to increase driving the system 121 into shutdown. In one embodiment, if the temperature of the system exceeds a temperature threshold, system 121 almost immediately triggers shutdown signal 122 to transition at time $T_3$ activating shutdown circuit 120.

In one embodiment, if the output current $I_{out}$ exceeds a predefined threshold current for a predefined time delay $t_D$, system 121 triggers the shutdown signal 122 at time $T_3$, where time $T_3$ is delayed by time $t_D$. In one embodiment, delay time $t_D$ is incorporated within system 121, or alternatively in shutdown circuit 120, to avoid deactivating driving circuit 124 in the event of glitching, current or voltage spikes, as well as during power-up and power-down procedures of system 121 and shutdown and reactivation circuit 120. This delayed time $t_D$ ensures that shutdown and reactivation circuit 120 is activated upon valid overcurrent conditions and that erroneous error reporting and shutdowns are eliminated. Triggered shutdown signal 122 passes through inverters $INV_9$ and $INV_{10}$ which speed up the signal edge of shutdown signal 122 and subsequently is inputted to first edge detector 144a. The input to first edge detector 144a is conducted directly to first input $A_1$ of first NAND gate $ND_1$ and is further passed through the series of inverters $INV_{11}$–$INV_{13}$ to be supplied to second input $B_1$ of first NAND gate $ND_1$. Because of the delay caused by the series of inverters $INV_{11}$–$INV_{13}$ forwarding the signal to second input $B_1$, both first input $A_1$ and second input $B_1$ are in a high state between times $T_4$ and $T_6$. These high states in both $A_1$ and $B_1$ cause first NAND gate $ND_1$ to output a low state signal 160 at $T_4$ until the input signal 148 of first edge detector 144a propagates through the series of inverters $INV_{11}$–$INV_{13}$ to transition second input $B_1$ low at time $T_6$. Thus, first edge detector 144a detects the transition of shutdown signal 122 and generates a low pulse 160 through first NAND gate $ND_1$. Low pulse 160 generated by first edge detector 144a is forwarded through inverter $INV_{14}$ to supply a high pulse 162 to set-input S of flip-flop 150 causing first output Q to transition to a high state. The transition of first flip-flop output Q shuts off driving circuit switch 152 deactivating driving circuit 124 by activating first Nch transistor MN1 which in turn shuts-off second Nch transistor MN2, thus, output current $I_{out}$ is turned off. High pulse 162 at set-input S further causes second output QB to transition low activating first Pch transistor MP1 of charging circuit 132 to produce charging current $I_C$.

Flip-flop 150 maintains this state, Q in a high state and QB in a low state, until short circuit 130 is eliminated and output voltage $V_{out}$ across capacitive load $C_L$ is charged by charging current $I_C$ to the threshold level of inverter $INV_1$. It will be apparent to one skilled in the art that the levels of the states can be reversed and the threshold levels altered without departing from the novelty of the invention.

Figure 5:
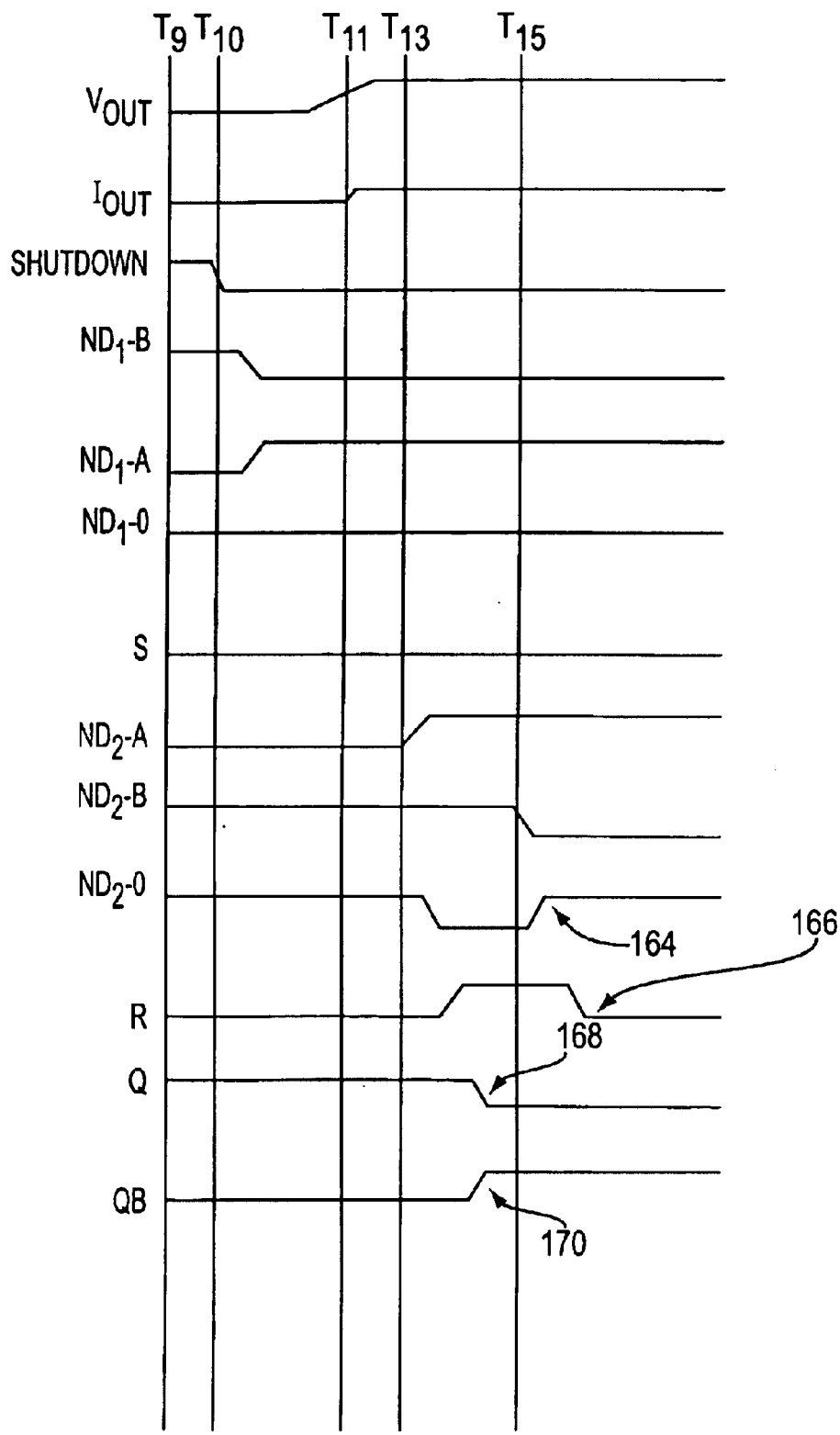
FIG. 5 shows one embodiment of a simplified timing diagram of the operation of the deactivation of the shutdown and reactivation circuit and the reactivation of the system.

Referring to FIGS. 3 and 5, FIG. 5 shows one embodiment of a simplified timing diagram of the operation of shutdown and reactivation circuit 120 depicted in FIG. 3 when capacitive load $C_L$ is charged to the threshold level of inverter $INV_1$ and shutdown signal 122 is deactivated. At time $T_9$, system 121 (not shown) and shutdown and reactivation circuit 120 are in the shutdown state as described in reference to FIG. 4 at time $T_8$. At Time $T_{10}$ short circuit 130 and load 126 are removed causing shutdown signal to transition low. At time $T_{11}$ output voltage $V_{out}$ across capacitive load $C_L$ reaches the threshold level of inverter $INV_1$. The transition at the input of inverter $INV_1$ from low to high is propagated through the series of inverters $INV_1$–$INV_4$ speeding up the signal edge and provide the input signal to second edge detector 144b. Thus, first input $A_2$ of second NAND gate $ND_2$ receives the transition of signal 146 from low to high following the delay through inverters $INV_1$–$INV_4$ at time $T_{13}$. The input to second edge detector 144b is further propagated through the series of inverters $INV_5$–$INV_7$ to transition second input $B_2$ of second NAND gate $ND_2$ at time $T_{15}$. Because both inputs $A_2$ and $B_2$ of second NAND gate $ND_2$ are in a high state between times $T_{13}$ and $T_{15}$, second edge detector 144b generates a low pulse 164. Low pulse 164 is inverted through inverter $INV_8$ which supplies a high pulse 166 to reset-input R of flip-flop 150 resetting flip-flop 150. Thus, first output Q of flip-flop 150 transitions from high to low 168 reactivating driving circuit 124, and second output QB transitions from low to high 170 deactivating charging circuit 132. The reactivation of driving circuit 124 reinitializing system 121 to drive output load 126 through driving circuit 124 without the need to reset or re-enable either system 121 or shutdown and reactivation circuit 120. Further, system 121 is reactivated without requiring shutdown and reactivation circuit 120 to continuously toggle on and off to determine when the short circuit 130 is removed, avoiding continued heating of system 121, and further avoiding the increased power consumption of the prior art.

Figure 6:
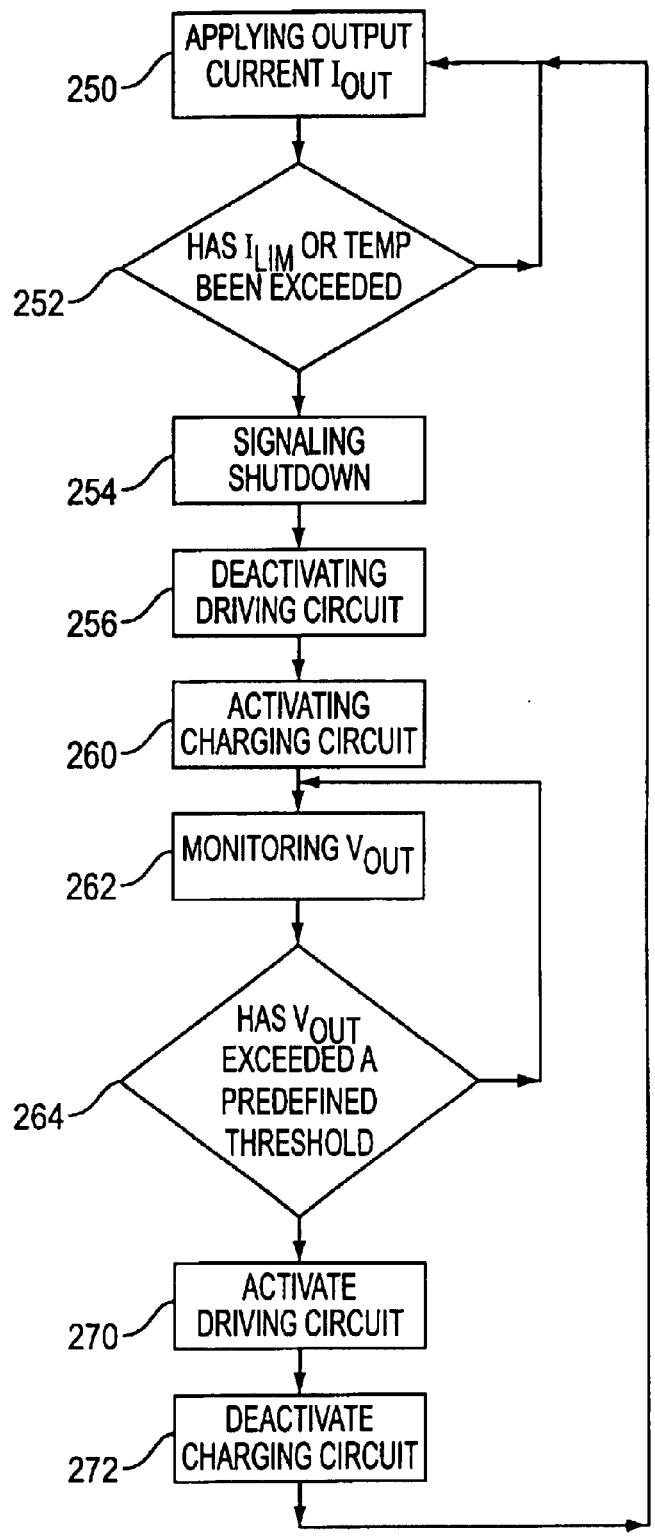
FIG. 6 depicts a flow diagram of one embodiment of the method of providing thermal shutdown protection and current limit protection of the present invention for preventing damaging effects to a system.

FIG. 6 depicts a flow diagram of one embodiment of the method of providing thermal and current limit protection with system reactivation of the present invention for preventing damaging effects to a system. Initially in step 250, system 121 is operating under normal conditions such that output current $I_{out}$ is supplied through driving circuit 124 to load 126 and load 126 is not short circuited. In step 252, it is determined whether output current $I_{out}$ has exceeded predefined limits $I_{Lim}$ or thermal threshold has been exceeded signaling shutdown and reactivation circuit 120. If thermal and/or output current thresholds have not been exceeded, then the process returns back to step 250 such that system 121 continues to operate normally. If thermal or output current thresholds have been exceeded, then step 254 is entered where shutdown signal 122 is activated. In step 256, shutdown and reactivation circuit 120 deactivates driving circuit 124 to shutdown output current $I_{out}$. In step 260, charging circuit 132 is activated to supply capacitive load $C_L$ with charging current $I_C$. In step 262, shutdown and reactivation circuit 120 monitors output voltage $V_{out}$. In step 264, shutdown and reactivation circuit 120 determines if output voltage exceeds a predefined threshold designating that short circuit 130 has been removed. If not, the process returns to step 262 where shutdown and reactivation circuit 120 continues to monitor output voltage $V_{out}$. If output voltage $V_{out}$ exceeds the predefined threshold, the process shifts to step 266 where driving circuit 124 is reactivated to again begin to supply load 126 with output current $I_{out}$. In step 270, charging circuit 132 is deactivated shutting off charging current $I_C$ and returning system 121 and process to step 250 for normal operation.

Figure 7:
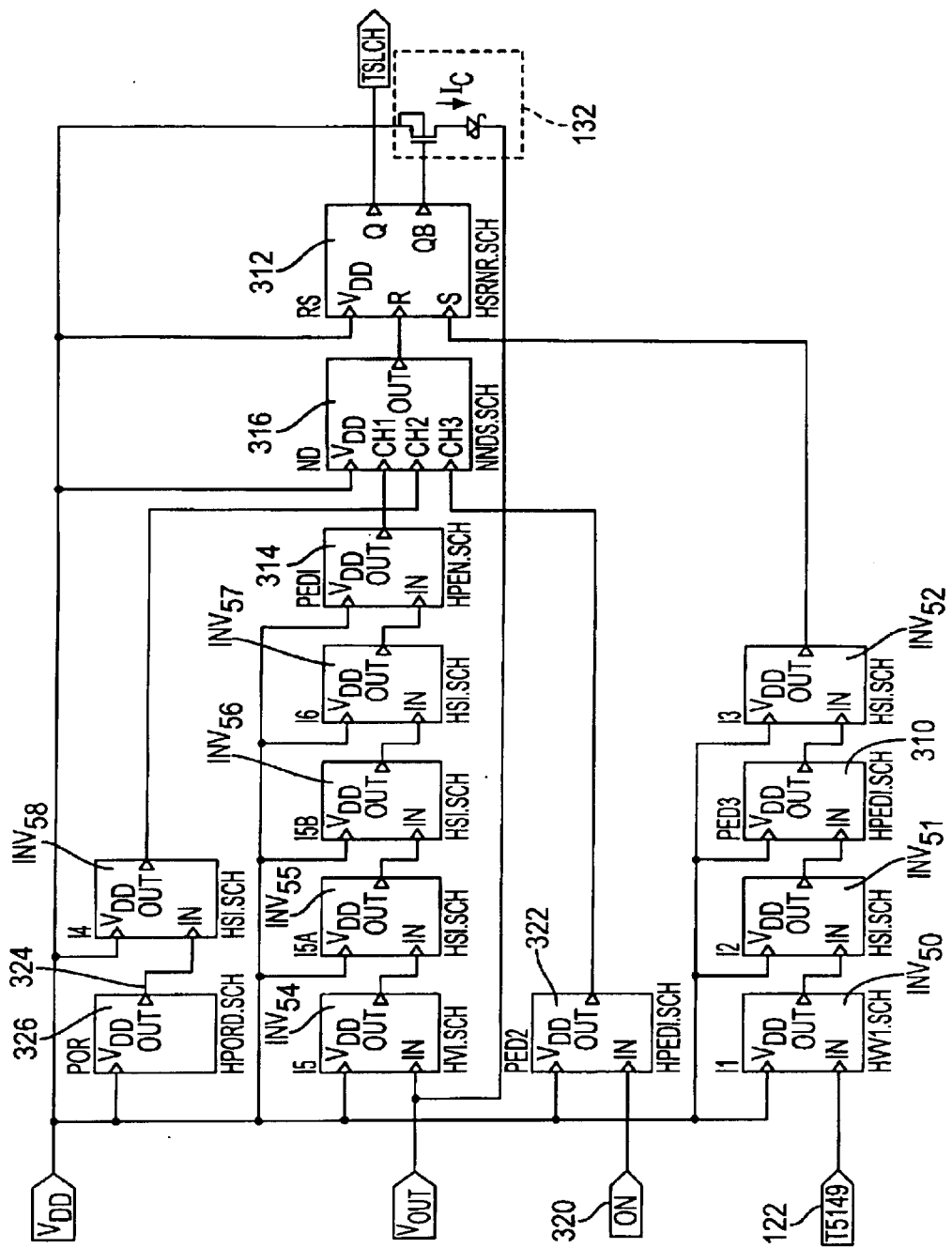
FIG. 7 depicts a block diagram of an alternative embodiment of the shutdown circuit.

FIG. 7 depicts a block diagram of one embodiment of shutdown and reactivation circuit 120. Shutdown signal 122 couples with first edge detector 310 through a pair of series coupled inverters $INV_{50}$ and $INV_{51}$. First edge detector 310 registers the assertion of the shutdown signal 122 and outputs a pulse through inverter $INV_{52}$ to a set-input S of latch 312. The pulse at set-input S of latch 312 reverses the states of first latch output Q and second latch output QB. The transition of first output Q deactivates driving circuit 124 (not shown) thus preventing the flow of output current $I_{out}$ through short circuit 130 (not shown) and prevents further power dissipation and heating of system 121. The transition of second output QB activates charging circuit 132 to supply the small charging current $I_C$ to load 126 (not shown). Once short circuit 130 has been eliminated, charging current $I_C$ charges capacitive load $C_L$ (not shown) increasing output voltage $V_{out}$. Once output voltage $V_{out}$ reaches a threshold level of inverter $INV_{54}$, inverter $INV_{54}$ forwards a signal through the series of inverters $INV_{55}$, $INV_{56}$ and $INV_{57}$ to second edge detector 314. Second edge detector 314 detects the pulse signaling the removal of short circuit 130 and outputs a signal to reset-input R of latch 312 through NAND gate 316. Latch 312 is reset causing outputs Q and QB to transition to opposite states reactivating driving circuit 124 (not shown) and deactivating charging circuit 132. In one embodiment, NAND gate 316 is a three input NAND gate receiving not only the pulse from second edge detector 314, but also the transition of an enable signal 320 through third edge detector 322, and a cycling supply signal 324 from a power-on-reset 326 through inverter $INV_{58}$ to provide further control over shutdown and reactivation circuit 120.

The invention now being fully described, it will be apparent to one of ordinary skill in the art that many changes and modifications can be made thereto without departing from the spirit or scope of the appended claims.

What is claimed is:

1. A reactivation circuit coupled with a system having a protection mechanism which prevents runaway current, the reactivation circuit comprising:

a charging circuit coupled with a storage element, the charging circuit configured to supply a charging a current to the storage element, once the protection mechanism is activated to prevent the supplying of the output current;

a monitoring circuit coupled with the system, the storage element, and the charging circuit, the monitoring circuit configured to monitor the voltage across the storage element and to signal the system when voltage across the storage element exceeds a predefined threshold and further configured to deactivate the charging circuit when the voltage across the storage element exceeds the predefined threshold; and a latch coupled between the monitoring circuit and both the charging circuit and the system, configured to receive a signal from the monitoring circuit, the latch further configured to maintain the charging circuit in at least a deactivated state as signaled by the monitoring circuit.

2. The reactivation circuit as claimed in claim 1, wherein:
the storage element coupled in parallel with a load such that the voltage across the storage element is substantially equal to a voltage across the load.

3. The reactivation circuit as claimed in claim 2, wherein:
the storage element includes a capacitance.

4. A system configured to supply an output current to a load and having shutdown protection, the system comprising:
a shutdown signal configured to signal the system to stop supplying the load with the output current;
a first monitoring circuit coupled with the load, the monitoring circuit configured to monitor an output voltage across the load and to signal the system to again supply the output current to the load when the output voltage exceeds a predetermined voltage threshold;
a charging circuit coupled with the shutdown signal and the load, the charging circuit configured to supply the load with a charging current when signaled by the shutdown signal; and
a latch coupled between the first monitoring circuit and the charging circuit;
the latch configured to maintain the charging circuit in a deactivated and active state as signaled by the first monitoring circuit.

5. The system as claimed in claim 4, wherein:
the load includes at least a capacitive load configured to receive the charging current.

6. The system as claimed in claim 5, wherein:
the capacitive load is configured to receive the charging current when a short circuit across the load has been removed.

7. The system as claimed in claim 4, further comprising:
a driving circuit coupled with the load, and configured to supply the load with the output current.

8. The system as claimed in claim 7, wherein:
the driving circuit includes at least one switch having at least a first and second state, such that the driving circuit delivers the output current to the load when the switch is in the first state and the driving circuit is prevented from delivering the output current to the load when the switch is in the second state.

9. The system as claimed in claim 7, wherein:
the driving circuit includes at least a first transistor coupled with a second transistor;
the first transistor further coupled with the first monitoring circuit such that the first monitoring circuit signals the first transistor to toggle from a first state to a second state; and
the first transistor configured to toggle the second transistor to a third state when first transistor is toggled to the second state and to toggle the second transistor to a fourth state when the first transistor is toggled to the first stale such that the driving circuit conducts the output current to the load when second transistor is in the third state and the driving circuit does not conduct the output current to the load when the second transistor is in the fourth state.

10. The system as claimed in claim 7, wherein:
not activating the driving circuit until a system temperature is at least equal to a lower predefined temperature.

11. A system configured to supply an output current to a load and having shutdown protection, the system comprising:
a shutdown signal configured to signal the system to stop supplying the load with the output current;
a first monitoring circuit coupled with the loud, the monitoring circuit configured to monitor an output voltage across the load and to signal the system to again supply the output current to the load when the output voltage exceeds a predefined voltage threshold;
a charging circuit coupled with the shutdown signal and the load, the charging circuit configured to supply the load with a charging current when signaled by the shutdown signal; and
a latch further coupled between the shutdown signal and the charging circuit,
the latch configured to maintain the charging circuit in an active or deactivated state as signaled by the shutdown signal.

12. The system as claimed in claim 11, wherein:
the latch is further configured to maintain the charging circuit in the active state to supply one of a plurality of charging currents such that each one of the plurality of charging current has a different predefined current level.

13. The system as claimed in claim 11, wherein:
the load includes at least a capacitive load configured to receive the charging current.

14. The system as claimed in claim 13, wherein:
the capacitive load is configured to receive the charging current when a short circuit across the load has been removed.

15. The system as claimed in claim 11, further comprising:
a driving circuit coupled with the load, and configured to supply the load with the output current.

16. The system as claimed in claim 15, wherein:
the driving circuit includes at least one switch having at least a first and second state, such that the driving circuit delivers the output current to the load when the switch is in the first state and the driving circuit is prevented from delivering the output current to the load when the switch is in the second state.

17. The system as claimed in claim 15, wherein:
the driving circuit includes at least a first transistor coupled with a second transistor;
the first transistor further coupled with the first monitoring circuit such that the first monitoring circuit signals the first transistor to toggle from a first state to a second state; and
the first transistor configured to toggle the second transistor to a third state when first transistor is toggled to the second state and to toggle the second transistor to a fourth state when the first transistor is toggled to the first state such that the driving circuit conducts the output current to the load when second transistor is in the third state and the driving circuit does not conduct the output current to the load when the second transistor is in the fourth state.

18. The system as claimed in claim 15, wherein:
not activating the driving circuit until a system temperature is at least equal to a lower predefined temperature.

19. A system configured to supply an output current to a load and having shutdown protection, the system comprising:
a shutdown signal configured to signal the system to stop supplying the load with the output current;
a first monitoring circuit coupled with the load, the monitoring circuit configured to monitor an output voltage across the load and to signal the system to again supply the output current to the load when the output voltage exceeds a predefined voltage threshold;

a charging circuit coupled with the shutdown signal and the load, the charging circuit configured to simply the load with a charging current when signaled by the shutdown signal; and a second monitoring circuit coupled with the shutdown signal and the charging circuit, the second monitoring circuit configured to monitor the shutdown signal and to signal the charging circuit when the shutdown signal transitions from a first state to a second state.

20. The system as claimed in claim 19, wherein:

the first monitoring circuit includes at least a first edge detector configured to detect a transition of the output voltage when the output voltage is at least equal to the predefined threshold voltage.

21. The system as claimed in claim 20, wherein:

the second monitoring circuit includes at least a second edge detector configured to detect a transition of the shutdown signal signaling the system temperature is at least equal to a predefined temperature threshold.

22. The system as claimed in claim 19, further comprising:

a driving circuit coupled with the load, and configured to supply the load with the output current.

23. The system as claimed in claim 22, wherein:

the driving circuit includes at least one switch having at least a first and second state, such that the driving circuit delivers the output current to the load when the switch is in the first state and the driving circuit is prevented from delivering the output current to the load when the switch is in the second state.

24. The system as claimed in claim 22, wherein:

the driving circuit includes at least a first transistor coupled with a second transistor;

the first transistor further coupled with the first monitoring circuit such that the first monitoring circuit signals the first transistor to toggle from a first state to a second state; and the first transistor configured to toggle the second transistor to a third state when first transistor is toggled to the second state and to toggle the second transistor to a fourth state when the first transistor is toggled to the first state such that the driving circuit conducts the output current to the load when second transistor is in the third state and the driving circuit does not conduct the output current to the load when the second transistor is in the fourth state.

25. The system as claimed in claim 22, wherein:

not activating the driving circuit until a system temperature is at least equal to a lower predefined temperature.

26. A method of reactivating a system following deactivation due to runaway current, comprising:

receiving a shutdown signal;

deactivating a driving circuit configured to supply an output current to a load after receiving the shutdown signal;

supplying a charging current to a storage element;

monitoring a voltage across the storage element reactivating the system when the voltage across the storage element is at least equal to a predefined voltage threshold; and maintaining the driving circuit in a deactivated state and maintaining the charging circuit in an active state including latching the driving circuit in the deactivated state and the charging circuit in an active state, until the voltage across the storage element is at least equal to the predefined threshold voltage.

27. The method as claimed in claim 26, wherein:

the act of supplying the storage element with the charging current wherein the storage element includes a capacitance and the charge current is supplied to the capacitance.

28. The method as claimed in claim 26, further comprising:

halting the supply of the charging current when the output voltage is at least equal to the predefined voltage threshold.

29. The method as claimed in claim 26, further comprising:

supplying a load with an output current prior to the step of receiving a shutdown signal; and halting the supply of the output current to the load following the step of receiving a shutdown signal.

* * * * *